(12) United States Patent
Carr et al.

(10) Patent No.: US 10,465,540 B2
(45) Date of Patent: Nov. 5, 2019

(54) AIRFOIL ASSEMBLY WITH SPACER AND TIE-SPAR

(71) Applicant: United Technologies Corporation, Farmington, CT (US)

(72) Inventors: Jesse M. Carr, Hartford, CT (US); Bryan P. Dube, Columbia, CT (US)

(73) Assignee: United Technologies Corporation, Farmington, CT (US)

( * ) Notice: Subject to any disclaimer, the term of this patent is extended or adjusted under 35 U.S.C. 154(b) by 15 days.

(21) Appl. No.: 16/154,754

(22) Filed: Oct. 9, 2018

(65) Prior Publication Data

US 2019/0093490 A1 Mar. 28, 2019

Related U.S. Application Data

(63) Continuation of application No. 14/838,412, filed on Aug. 28, 2015, now Pat. No. 10,107,117.

(Continued)

(51) Int. Cl.
*F01D 9/04* (2006.01)
*F01D 5/24* (2006.01)
(Continued)

(52) U.S. Cl.
CPC ............. *F01D 9/041* (2013.01); *F01D 5/284* (2013.01); *F01D 9/042* (2013.01); *F01D 25/246* (2013.01);
(Continued)

(58) Field of Classification Search
CPC ...... F01D 25/0246; F01D 5/284; F01D 9/042; F01D 25/246; F05D 2220/32;
(Continued)

(56) References Cited

U.S. PATENT DOCUMENTS

| 4,396,349 A | * | 8/1983 | Hueber | ........... F01D 5/284 415/115 |
| 5,538,380 A | | 7/1996 | Norton et al. | |

(Continued)

FOREIGN PATENT DOCUMENTS

| EP | 1764481 | 3/2007 |
| EP | 2584152 | 4/2013 |

(Continued)

OTHER PUBLICATIONS

European Search Report for European Patent Application No. 15187602 dated Mar. 8, 2016.

*Primary Examiner* — Patrick D Maines
*Assistant Examiner* — Dapinder Singh
(74) *Attorney, Agent, or Firm* — Carlson, Gaskey & Olds, P.C.

(57) ABSTRACT

An airfoil assembly includes at least one airfoil that has a hollow interior. First and second platforms are disposed between the airfoil. At least one tie-spar extends along an axis through the first platform, the hollow interior of the airfoil, and the second platform. There is a thermal expansion difference between a thermal expansion of the tie-spar in the axial direction and the combined thermal expansion of the airfoil and the first and second platform in the axial direction. At least one spacer portion is arranged on the tie-spar. The spacer portion has a thermal expansion in the axial direction that is greater than the thermal expansion difference such that the spacer portion maintains the tie-spar under tension and clamps the first and second platforms on the airfoil.

22 Claims, 8 Drawing Sheets

Related U.S. Application Data

(60) Provisional application No. 62/057,748, filed on Sep. 30, 2014.

(51) Int. Cl.
 F01D 5/28 (2006.01)
 F01D 25/24 (2006.01)

(52) U.S. Cl.
 CPC ...... *F05D 2220/32* (2013.01); *F05D 2230/51* (2013.01); *F05D 2230/60* (2013.01); *F05D 2230/642* (2013.01); *F05D 2240/12* (2013.01); *F05D 2240/80* (2013.01); *F05D 2260/31* (2013.01); *F05D 2300/5021* (2013.01); *Y02T 50/672* (2013.01); *Y02T 50/673* (2013.01); *Y02T 50/6765* (2018.05)

(58) Field of Classification Search
 CPC ............ F05D 2230/51; F05D 2230/60; F05D 2230/642; F05D 2240/80; F05D 2260/31; F05D 2300/5021; F05D 2300/50211; F05D 2300/50212; Y02T 50/672; Y02T 50/673
 USPC ........................................................ 415/134
 See application file for complete search history.

(56) References Cited

U.S. PATENT DOCUMENTS

| 8,313,275 | B2 | 11/2012 | Miller et al. |
| 2013/0094951 | A1* | 4/2013 | McCaffrey ............ F01D 25/162 |
| | | | 415/200 |
| 2014/0013770 | A1 | 1/2014 | Farah et al. |

FOREIGN PATENT DOCUMENTS

| JP | 61-066802 | 5/1986 |
| WO | 2014011979 | 1/2014 |
| WO | 2014100347 | 6/2014 |

\* cited by examiner

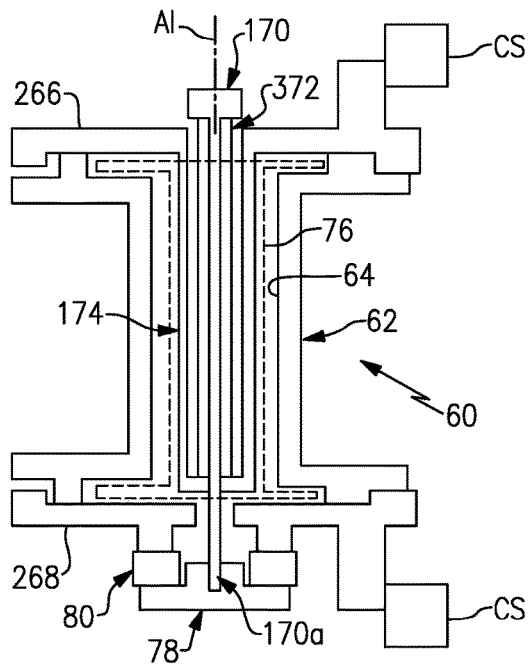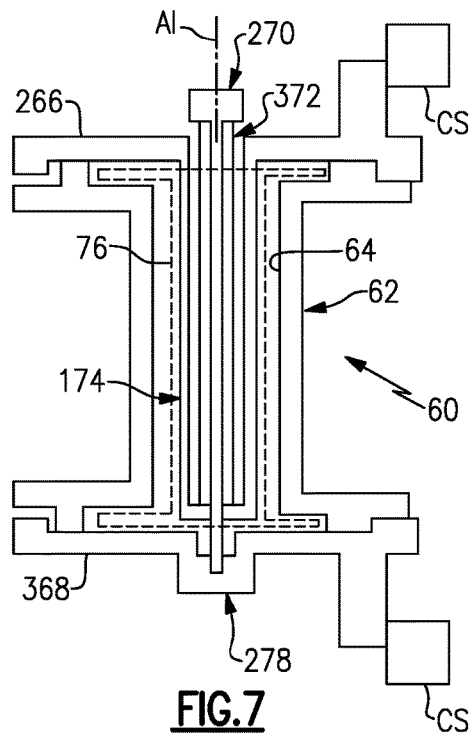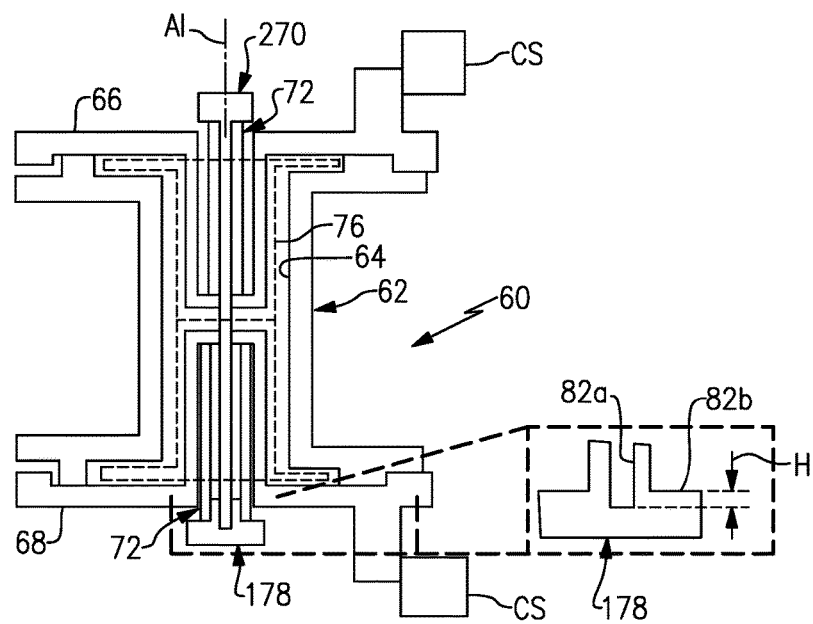

AIRFOIL ASSEMBLY WITH SPACER AND TIE-SPAR

CROSS-REFERENCE TO RELATED APPLICATION

This disclosure is a continuation of U.S. patent application Ser. No. 14/838,412 filed Aug. 28, 2015, which claims priority to U.S. Provisional Patent Application No. 62/057,748, filed Sep. 30, 2014.

STATEMENT REGARDING FEDERALLY SPONSORED RESEARCH OR DEVELOPMENT

This invention was made with government support under contract number FA8650-09-D-2923-0021 awarded by the United States Air Force. The government has certain rights in the invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil assembly according to an example of the present disclosure includes at least one airfoil that has a hollow interior and first and second platforms between which the airfoil is disposed. At least one tie-spar extends along an axis through the first platform, the hollow interior of the airfoil, and the second platform. There is a thermal expansion difference D between a thermal expansion T1 of the tie-spar in the axial direction and a combined thermal expansion T2 of the airfoil and the first and second platforms in the axial direction. At least one spacer portion is arranged on the tie-spar, and the spacer portion has a thermal expansion T3 in the axial direction that is greater than the thermal expansion difference D such that the spacer portion maintains the tie-spar under tension and clamps the first and second platforms on the airfoil.

In a further embodiment of any of the foregoing embodiments, the spacer portion extends partially in the hollow interior of the airfoil.

In a further embodiment of any of the foregoing embodiments, the spacer portion has an aspect ratio of length-to-width of greater than one, with the length being along the axial direction and the width being perpendicular to the axial direction.

In a further embodiment of any of the foregoing embodiments, each of the first and second platforms extends partially in the hollow interior of the airfoil.

In a further embodiment of any of the foregoing embodiments, the spacer portion includes a central through-hole, through which the tie-spar is received, and a majority of the length of the tie-spar is within the through-hole.

In a further embodiment of any of the foregoing embodiments, the spacer portion is integral with one of the first and second platforms as a monolithic piece.

In a further embodiment of any of the foregoing embodiments, the spacer portion is outboard of the first and second platforms with respect to the hollow interior of the airfoil.

In a further embodiment of any of the foregoing embodiments, the at least one spacer portion includes two spacer portions, one of which is located near a first end of the tie-spar and the other of which is located near a second opposed end of the tie-spar.

In a further embodiment of any of the foregoing embodiments, the hollow interior of the airfoil has multiple cavities, and the at least one tie-spar includes multiple tie-spars that extend, respectively, through the multiple cavities.

In a further embodiment of any of the foregoing embodiments, there is an annular clearance gap between an exterior of the tie-spar and an interior of the spacer portion.

In a further embodiment of any of the foregoing embodiments, the exterior of the tie-spar and the interior of the spacer portion each include a thermal barrier coating.

In a further embodiment of any of the foregoing embodiments, the airfoil is free of direct contact with the first and second platforms.

A further embodiment of any of the foregoing embodiments includes a baffle in the hollow interior of the airfoil and through which the tie-spar extends.

In a further embodiment of any of the foregoing embodiments, the baffle extends from the hollow interior of the airfoil to an attachment portion external of the hollow interior.

A further embodiment of any of the foregoing embodiments includes a clip that abuts a bearing face of the tie-spacer and a surface of the spacer portion to lock the tie-spar under tension.

A further embodiment of any of the foregoing embodiments includes a classified spacer mounted on the tie-spar.

In a further embodiment of any of the foregoing embodiments, the classified spacer is an end cap mounted on an end of the tie-spar.

In a further embodiment of any of the foregoing embodiments, the airfoil includes a radial wall that has protruding radial arms that partially extend around one of the first and second platforms.

A gas turbine engine according to an example of the present disclosure includes an airfoil assembly of any the foregoing embodiments.

A method for making an airfoil assembly of any the foregoing embodiments includes arranging at least one tie-spar to extend along an axis through a first platform, a hollow interior of an airfoil, and a second platform, with a thermal expansion difference D between a thermal expansion T1 of the tie-spar in the axial direction and a combined thermal expansion T2 of the airfoil and the first and second platforms in the axial direction; and maintaining the tie-spar under tension to clamp the first and second platforms on the airfoil by using at least one spacer portion arranged on the tie-spar, and the spacer portion has a thermal expansion T3 in the axial direction that is greater than the thermal expansion difference D to maintain the tie-spar under tension and clamp the first and second platforms on the airfoil.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 5 illustrates another example airfoil assembly that has an elongated spacer portion, threaded end cap, and classified spacer.

FIG. 6 illustrates another example airfoil assembly that has a classified, threaded end cap.

FIG. 7 illustrates another example airfoil assembly with a threaded portion integrated into a platform that receives a threaded end of a tie-spar.

DETAILED DESCRIPTION

Figure 1:
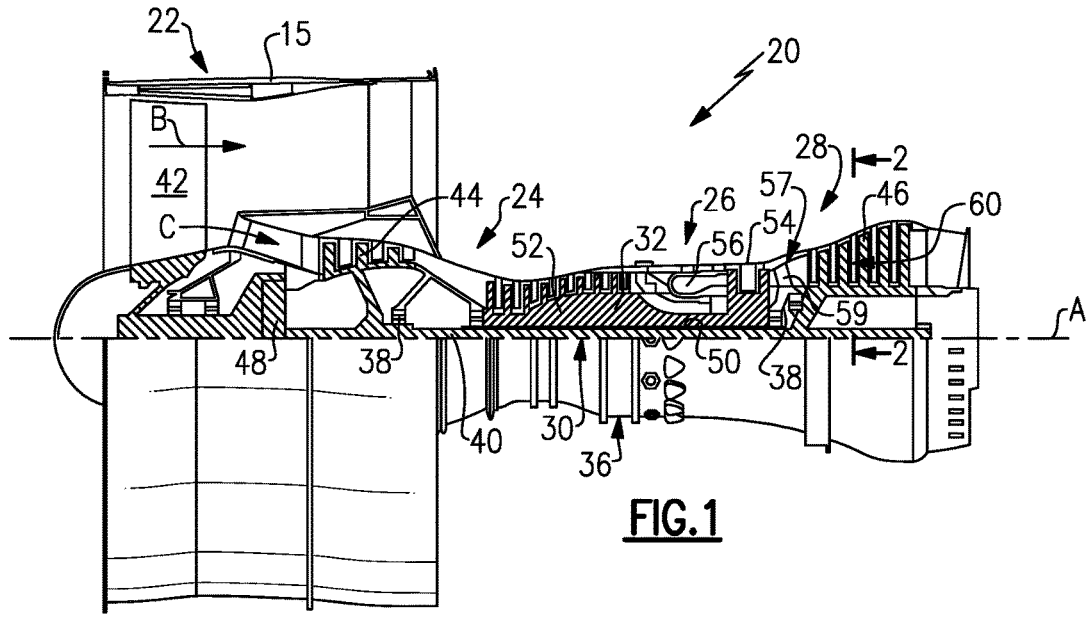
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines, including direct-drive architectures, three-spool architectures, and ground-based engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
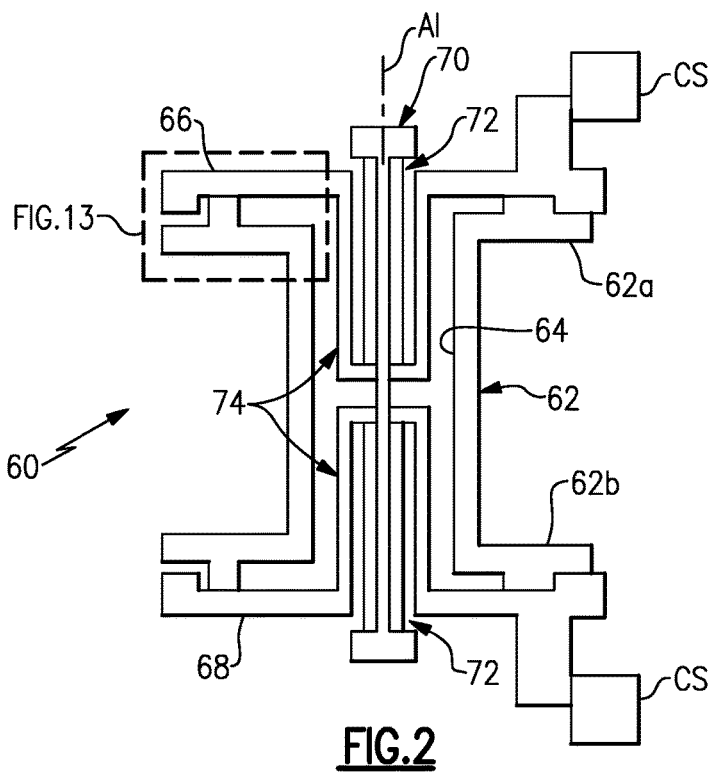
FIG. 2 illustrates an example airfoil assembly having at least one spacer portion and tie-spar.

The engine 20 also includes an airfoil assembly 60, which is shown in isolated view in FIG. 2. In this example, the airfoil assembly 60 is located in the turbine section 28 of the engine 20. However, it is to be understood that the examples herein are not limited to the turbine section 28 and may be applied to other sections of the engine 20.

The airfoil assembly 60 includes at least one airfoil 62 that has a hollow interior 64. Although not specifically shown, as is known, the airfoil 62 can have a leading end, a trailing end, and pressure and a suction sides joining the leading and trailing ends. Additionally, although only one airfoil 62 is shown, the airfoil assembly 60 could alternatively include additional airfoils 62. In this regard, the airfoil assembly 60 can be an arc segment of a full annular vane assembly, for example, where each arc segment includes multiple airfoil vanes.

In the illustrated example, the airfoil 62 includes a radially outer wall 62a and a radially inner wall 62b, relative to the engine central axis A. The radially inner and outer walls 62a/62b bound the core gas path C.

The airfoil 62 is mechanically trapped/clamped between first and second platforms 66/68. At least one tie-spar 70 extends along an axis A1 through the first platform 66, the hollow interior 64 of the airfoil 62, and the second platform 68. At least one spacer portion 72 is arranged on the tie-spar 70. In this example, the airfoil assembly includes two such spacer portions 72, with one at either end of the tie-spar 70. The tie-spar 70 is secured to clamp the spacer portions 72, the first and second platforms 66/68, and the airfoil 62 together in a radial stack. The airfoil assembly can be affixed with a case structure CS, which mechanically supports the airfoil assembly 60 in the engine 20. Although not shown, the airfoil assembly 60 can be affixed to the case structure CS using mechanical hooks, fasteners, or the like.

High-temperature materials are desired for the airfoil 62. However, such materials often have low ductility and low coefficient of thermal expansion ("CTE"). The low ductility can make a component more susceptible to tensile stresses relative to higher ductility superalloys, and low CTE can contribute to thermally-induced stresses and lack of sufficient mechanical constraint with surrounding components that have different CTE. In this regard, as described in more detail below, the airfoil assembly 60 provides an arrangement that permits use of low ductility, low CTE materials in the airfoil 62 while mitigating intolerable thermal and mechanical stresses and correctly positioning the component during operation, for example.

The airfoil 62 is formed of a relatively low ductility, low CTE material in comparison to nickel-based alloy that is more conventionally used in turbine sections. Example low ductility, low CTE material can include, but is not limited to, monolithic ceramic material, ceramic matrix composites, and molybdenum-based alloys. The first and second platforms 66/68 and spacer portion 72 are formed of higher ductility, higher CTE materials, such as nickel-based alloys. Thus, in combination, the first and second platforms 66/68 can bear aerodynamic loads borne from the airfoil 62 to reduce stress on the airfoil, while the airfoil 62 bears the high temperatures and thermally protects the first and second platforms 66/68.

Upon exposure to elevated operating conditions within the engine 20, the components of the airfoil assembly 60 thermally expand according to their individual CTE. Because the airfoil 62 is formed of a low CTE material, the airfoil 62 thermally expands along the axis A1 in an amount less than the thermal expansion of the tie-spar 70 and the platforms 66/68. That is, there is a thermal expansion difference D between a thermal expansion T1 of the tie-spar 70 in the axial direction A1 and a combined thermal expansion T2 of the airfoil 62 and the first and second platforms 66/68 in the same axial direction A1. In this regard, the spacer portion or portions 72 is/are selected such that it has a thermal expansion T3 in the axial direction A1 that is greater than the thermal expansion difference D. The spacer portion 72 thus expands by an amount that is greater than the difference D, to maintains the tie-spar 70 under tension and clamp the first and second platforms 66/68 on the airfoil 62 across all operating temperature conditions.

As will be appreciated from this disclosure, the size, geometry, and thermal exposure of the spacer portion 72 and tie-spar 70 can be altered, such as in the design stage, to control thermal expansion T3 to be greater than a given expansion difference D. For example, each of the first and second platforms 66/68 includes a recess 74 that extends into the hollow interior 64 of the airfoil 62. The spacer portion 72 is received into the recess 74 and thus is also partially in the hollow interior 64. The hollow interior 64 can be actively cooled, thus shielding at least a section of the tie-spar 70 from thermal transfer from the core gas path. In one example, a majority of the length of the tie-spar 70 is within the spacer portion 72. As a result, the thermal expansion difference can be reduced, which in turn reduces the expansion that the spacer portion 72 compensates for.

In this example, there are two such recesses 74 and two spacer portions 72, situated between the opposed ends of the tie-spar 70. The spacer portions 72 are separate and distinct pieces from the other components of the airfoil assembly and are generally cylindrical and elongated along the axis A1. In one example, each of the spacer portions 72 has an aspect ratio of length-to-width (diameter) of greater than one, with the length being along the axis A1 and the width being perpendicular to the axis A1. The elongation of the spacer portions 72 serves to increase thermal expansion of the spacer portions 72, while shorter spacer portions 72 would expand less for a given temperature increase. In this regard, the spacer portions 72 function as thermal springs in the airfoil assembly 60 to maintain the tie-spar 70 in tension over wide operating temperature conditions in the engine 20.

Figure 3:
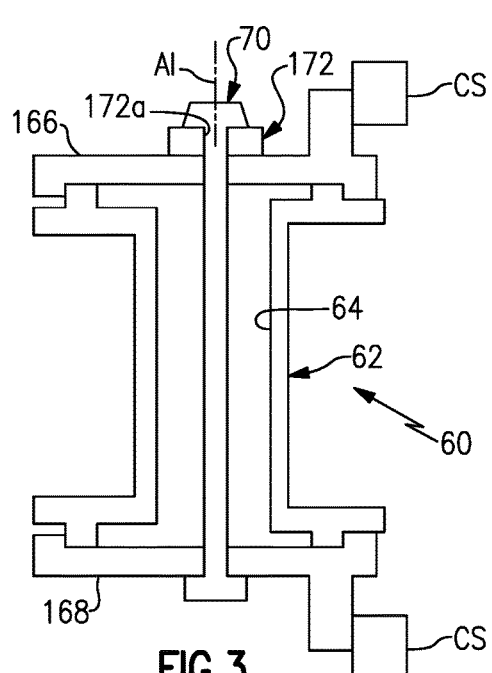
FIG. 3 illustrates another example airfoil assembly having another example spacer portion and tie-spar.

FIG. 3 shows another example of the airfoil assembly 60. In as much as possible in this disclosure, like reference numerals designate like elements where appropriate and reference numerals with the addition of one-hundred or multiples thereof designate modified elements that are understood to incorporate the same features and benefits of the corresponding elements. In this example, rather than the recesses 74, the first and second platforms 166/168 are relatively flat and the spacer portion 172 is shorter than the spacer portion 72 as shown in FIG. 2. Thus, the spacer portion 172 does not extend in the hollow interior 64 of the airfoil 62 and is thus outboard of the platform 166 with respect to the hollow interior 64. The spacer portion 172 is cylindrical and includes a central through-hole 172a through which the tie-spar 70 is received to secure the radial stack of the airfoil assembly 60 together. The presence or not of a spacer portion within the hollow interior 64 facilitates thermal management of the spacer portion and tie-spar 70, and thus the thermal expansion at the operating temperature conditions of the engine 20.

Figure 4:
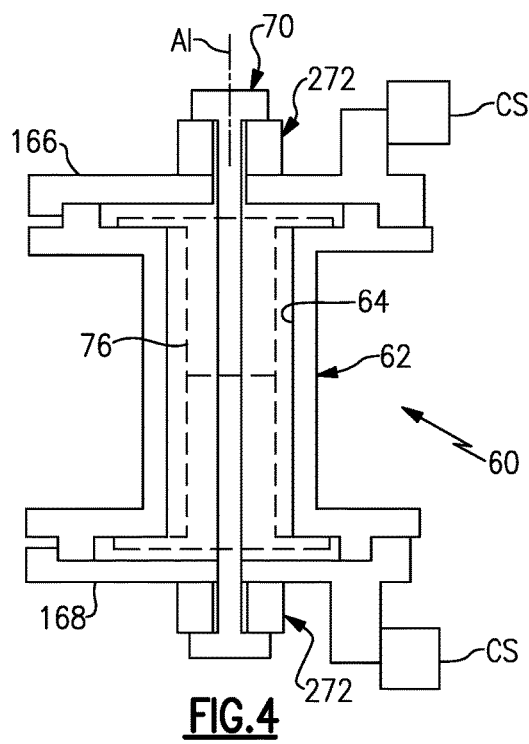
FIG. 4 illustrates another example airfoil assembly that has multiple spacer portions.

FIG. 4 shows another example of the airfoil assembly 60 that is somewhat similar to that in FIG. 3. In this example, the airfoil assembly 60 includes two spacer portions 272 arranged, respectively, near the opposed axial ends of the tie-spar 70. Additionally, a baffle 76 is included at least partially within the hollow interior 64 of the airfoil 62. For example, the baffle 76 can be a wall structure that circumscribes the central portion of the tie-spar 70. The wall structure can include holes or perforations to facilitate mixing of cooling air flow within the hollow interior 64. Thus, the baffle 76 facilitates thermal management of the tie-spar 70, and thus also facilitates control of the thermal expansion difference D and, in turn, the thermal expansion needed in the spacer portions 272 to compensate from the thermal expansion difference to maintain the tie-spar 70 under tension across wide operating temperature conditions. Although not shown in all of the examples herein, it is to be understood that the baffle 76 could be included in other examples herein.

FIG. 5 shows another example of the airfoil assembly 60. In this example, the platform 266 includes a recess 174, similar to the recess 74 shown in FIG. 2, but the platform 268 does not include such a recess. The recess 174 is elongated in comparison to the recess 74 in FIG. 2. Similarly, the spacer portion 372 is elongated relative to the spacer portion 72 of FIG. 2.

Additionally, the tie-spar 170 includes a threaded end 170a that is secured with a threaded end cap 78. Optionally, a classified spacer 80 is mechanically trapped between the threaded end cap 78 and the platform 268. For example, the classified spacer is a cylindrical piece that is received onto the tie-spar 372. As can be appreciated, the classified spacer 80 can alternatively be located elsewhere along the stack of the airfoil assembly 60. A classified spacer is one which is selected from a group of different, preset size classes in accordance with a determined spacing in the stack. For example, manufacturing tolerances in the components of the airfoil assembly 60 can lead to a variation in spacing in the stack. The classified spacer 80 can be selected from the size classes in accordance with spacing determined from such tolerances.

FIG. 6 shows another example airfoil assembly 60 that includes a classified, threaded end cap 178. The classified, threaded end cap 178 incorporates the end cap 78 and classified spacer 80 of FIG. 5 into a single component. As shown in the inset of FIG. 6, the classified, threaded end cap 178 includes a recess 82a that is threaded to receive a threaded end of the tie-spar 270. A land surface 82b surrounds the recess 82a and serves as a bearing surface that receives the end of the spacer portion 72. A vertical dimension, H, between the location of the land surface 82b and the bottom surface of the recess 82a serves as a classified dimension that can be varied across classes to control the tension on the tie-spar 270 once assembled.

FIG. 7 shows another example airfoil assembly 60 that includes the recess 174 as shown in FIG. 5, but the functionality of the endcap 78 is integrated into the platform 368. In this regard, the platform 368 includes a threaded portion 278 into which a threaded end of the tie-spar 270 can be received to secure the radial stack.

Figure 8:
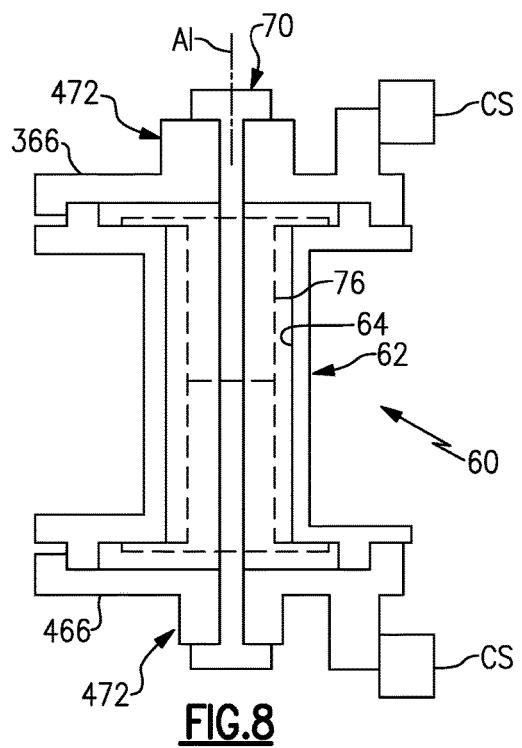
FIG. 8 illustrates another example airfoil assembly with spacer portions integrated into first and second platforms.

FIG. 8 shows another example of the airfoil assembly 60 that is somewhat similar to that of FIG. 4 except that in this example the spacer portions 472 are integrated into the platforms 366 and 466. Thus, each of the platforms 366/466 is a single, distinct piece that is monolithic and has a relatively enlarged portion that serves as the spacer portions 472. The relatively enlarged portions provide the thermal expansion T3 in the axial direction A1 that is greater than the thermal expansion difference D, discussed above.

Figure 9:
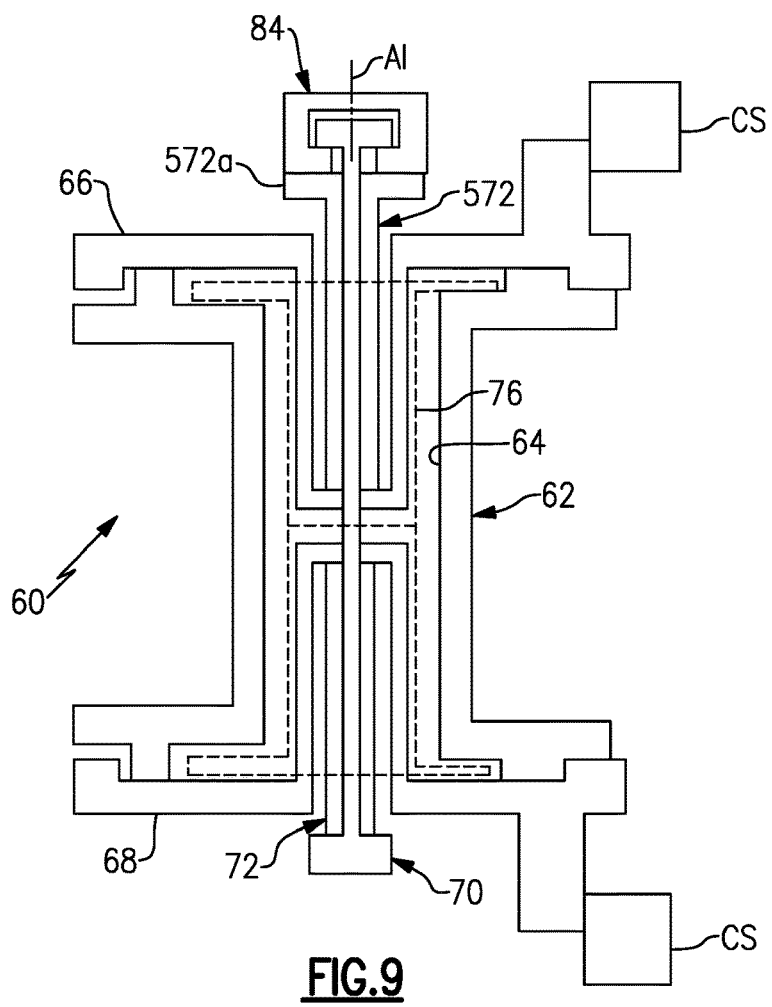
FIG. 9 illustrates another example airfoil assembly that has a tie-spar secured with a clip.
Figure 10:
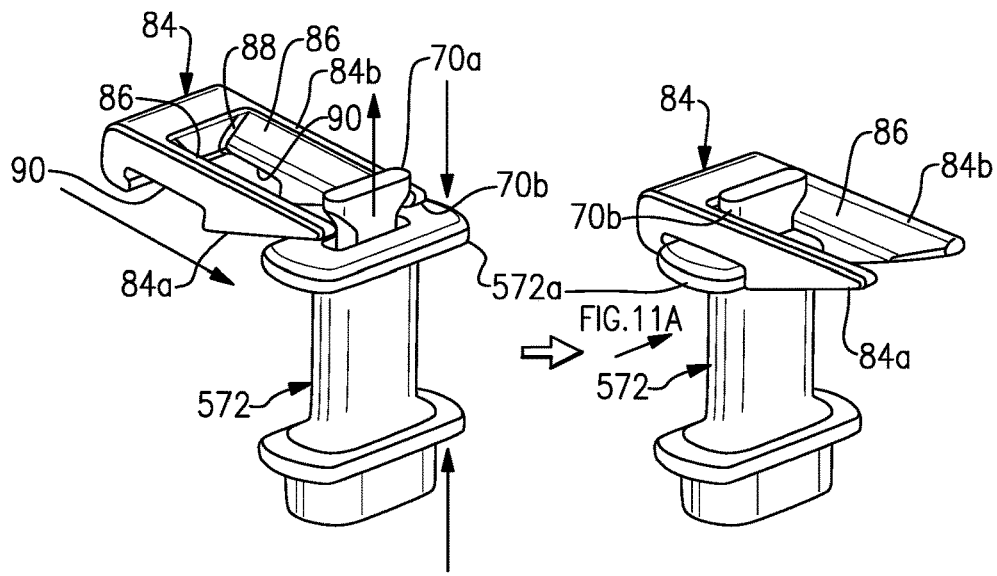
FIG. 10 illustrates assembly of the clip of FIG. 9.

FIG. 9 shows another example airfoil assembly 60, but rather than a threaded end cap or the like, the tie-spar 70 is secured at one end with a clip 84. In this example, as also shown in FIG. 10, the spacer portion 572 includes a flange 572a to facilitate mounting of the clip 84. In this example, the clip 84 is a wedge clip that can be slidably received along the flange 572a such that spaced apart arms 84a/84b of the clip 84 are received about an enlarged end 70a of the tie-spar 70. Interior surfaces 86 of the arms 84a/84b are slanted relative to the direction of movement of the clip 84 onto the tie-spar 70 such that the clip 84 can be slid across bearing surfaces 70b of the enlarged end 70a of the tie-spar 70. The clip 84 also includes a recess 88 near the base of the arms 84a/84b. Upon sliding the clip 84a over the enlarged end 70a, the enlarged end 70a is received into the recess 88, thus locking the clip 84 on the tie-spar 70. Each of the arms 84a/84b also includes an under-recess 90 that corresponds in geometry to the flange 572a of the spacer portion 572. Upon sliding the clip 84 over the enlarged end 70a and across the flange 572a, the flange 572a is received into the under-recess 90, thus locking the clip 84 on the spacer portion 572. The locking of the enlarged end 70a in the recess 88 and the locking of the flange 572a in the under-recess 90 serves to secure the tie-spar 70 and the spacer portion 572 together.

Figure 11A:
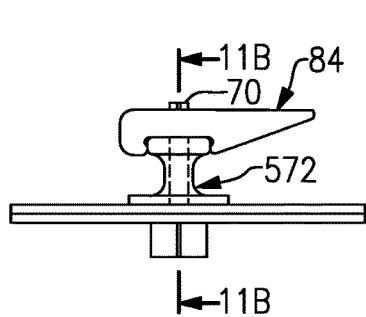
FIGS. 11A and 11B illustrate the clip of FIG. 10 in lateral view.
Figure 11B:
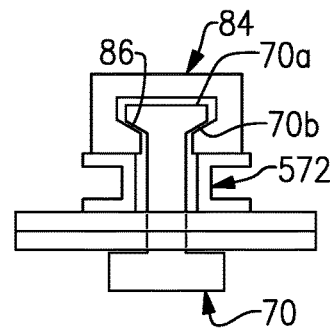
Figure 12:
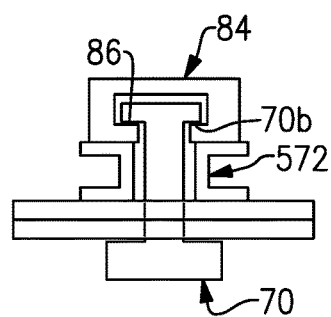
FIG. 12 illustrates another example clip that has flat bearing surfaces.

FIGS. 11A and 11B show additional views of the clip 84 secured on the tie-spar 70 and spacer portion 572. Notably, in these examples, the enlarged end 70a of the tie-spar 70 includes sloped bearing surfaces 70b that engage the sloped surfaces 86 of the arms 84a/84b. In a modified example shown in FIG. 12, the bearing surfaces 70b and the surfaces 86 are flat rather than sloped.

Figure 13:
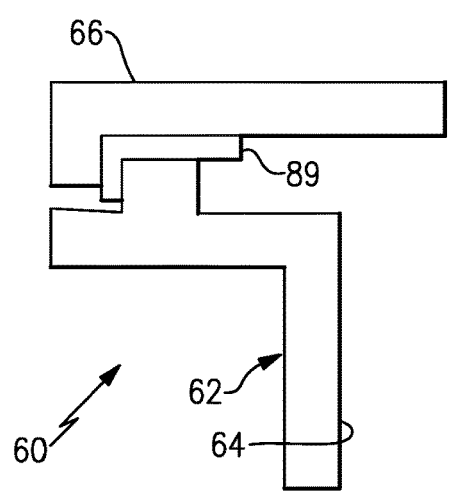
FIG. 13 illustrates another example airfoil assembly with a spacer chemically separating a platform and an airfoil.

FIG. 13 shows a portion of the airfoil 62 and platform 66. In this example, the platform 66 is free of direct contact with the airfoil 62, and a spacer 89 is arranged there between to prevent contact. For example, in instances where the material of the platform 66 is a superalloy and the material of the airfoil 62 is a refractory metal-based alloy or ceramic-based material, such materials can react if in direct contact. As an example, molybdenum, such as from as a molybdenum-based alloy of the airfoil 62, can react with nickel-based alloys. Such reactions may debit the properties of an airfoil assembly. To mitigate, or even eliminate such reactions, the spacer 89 is provided there between and chemically isolates the platform 66 from the airfoil 62. In one example, the spacer 89 is cobalt. As can be appreciated, additional such spacers 89 can be used in any of the airfoil assemblies 60 disclosed herein. Moreover, such spacers 89 can also be used between any second platform 68 and the airfoil 62. Alternatively, if there are no reactions or such reactions are negligible, the spacer 88 can be excluded such that the platform 66 and the airfoil 62 are in direct, intimate contact. In further examples, the spacer 89 can be bonded to the platform 66, the airfoil 62, or both, rather than being mechanically trapped. Example bond techniques can include welding or brazing. In another alternative, the spacer 88 can be integrated with either the platform 66 or the airfoil 62. For example, the composition of the platform 66 is altered locally to a composition that provides chemical isolation, such as during fabrication, to serve as the spacer. Additive manufacturing is one example fabrication technique that can be used to control localized composition.

Figure 14:
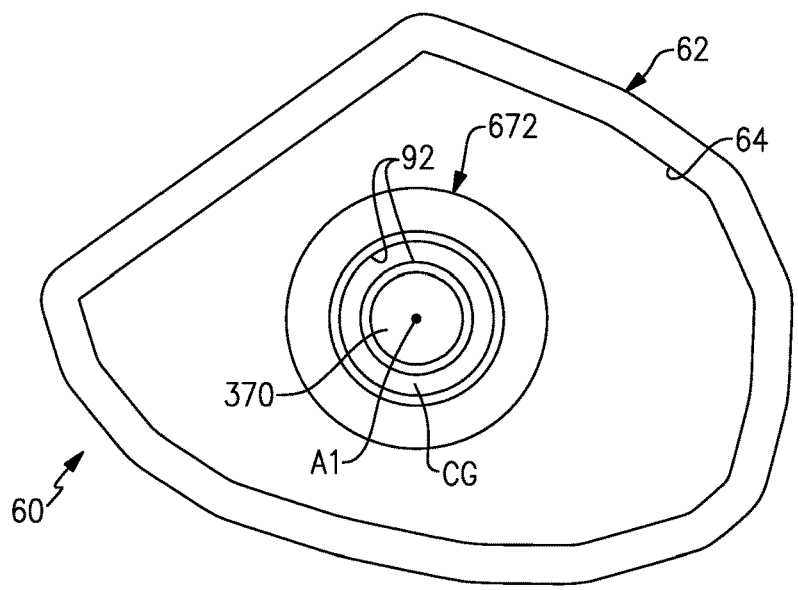
FIG. 14 illustrates another example airfoil assembly with a spacer portion and tie-spar that have a thermal barrier coating.

FIG. 14 shows selected portions of another example airfoil assembly 60. In this example, a portion of the hollow interior 64 of the airfoil 62 is shown in axial view with respect to axis A1, with the spacer 672 and tie-spar 370 extending there through. The spacer portion 672 and tie-spar 370 are sized such that there is a clearance gap CG there between. In this example, the clearance gap is annular. The exterior of the tie-spar 370 and the interior of the spacer portion 672, i.e., the surfaces that border the clearance gap, include a thermal barrier coating 92. For example, the thermal barrier coating 92 can be a ceramic-based material, such as but not limited to, a stabilized zirconia material. Example stabilized zirconia materials can include, but are not limited to, yttria stabilized zirconia, gadolinia stabilized zirconia, and combinations thereof. One or more intermediate bonding layers can also be used. The thermal barrier coating 92 serves to restrict thermal transfer from the core gas path C through the airfoil 62, and through the spacer portion 672 into the tie-spar 370. Thus, for a given operating temperature, the thermal exposure of the tie-spar 370 is limited such that the thermal expansion difference D is reduced.

Figure 15A:
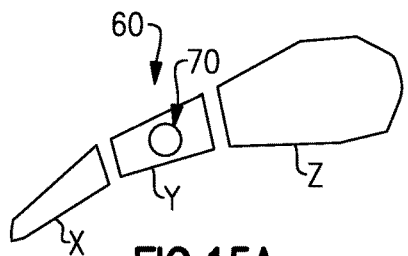
FIGS. 15A-F illustrate example tie-spar geometries and tie-spar locations within different cavities of an airfoil.
Figure 15D:
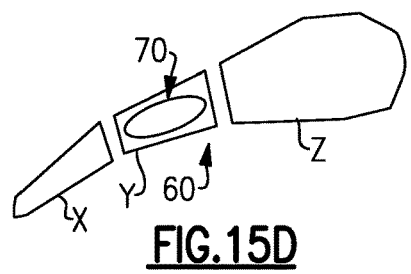
Figure 15B:
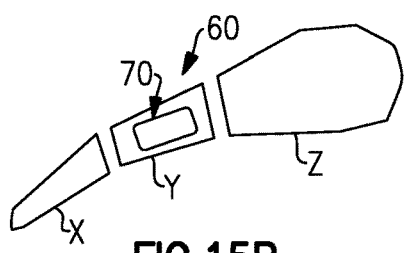
Figure 15E:
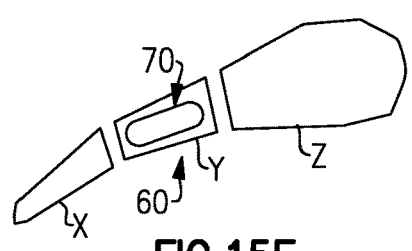
Figure 15C:
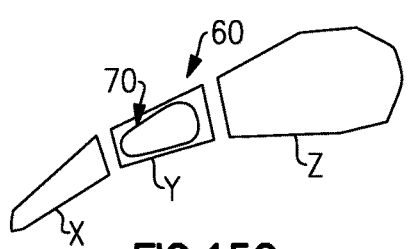
Figure 15F:
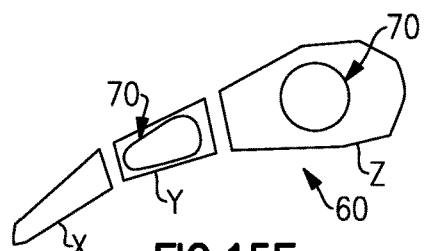

FIGS. 15A, 15B, 15C, 15D, 15E, and 15F show further examples, respectively, of airfoil assemblies 60 and tie-spars 70. In these examples, the airfoil 62 is represented by a plurality of cavities, namely cavity X, Y, and Z. Cavity Z is at the leading edge of the airfoil and cavity X is at the trailing edge, while cavity Y is an intermediate cavity. As shown, the tie-spars 70 can have any of various cross-sectional geometries. In FIG. 15A, the tie-spar 70 has a circular cross-section. In FIG. 15B, the tie-spar 70 has a rectangular cross-section. In FIG. 15C, the tie-spar has a "teardrop" cross-section. In FIG. 15D, the tie-spar 70 has an oval cross-section. In FIG. 15E, the tie-spar 70 has a "racetrack" cross-section. In FIG. 15F, the airfoil assembly includes two tie-spars 70, one of which has a "teardrop" cross-section and the other which has a circular cross-section. As can be appreciated, the cross-sectional shapes of the tie-spars 70 are not limited to the examples shown, and one or more tie-spars 70 can be used in any one or more of the cavities X, Y, and Z, which could also include additional or fewer cavities.

Figure 16A:
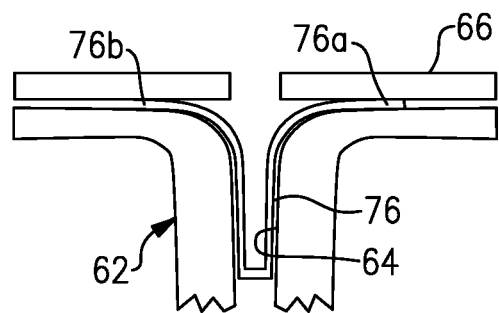
FIGS. 16A-C illustrate different examples of securing a baffle in an airfoil assembly.
Figure 16B:
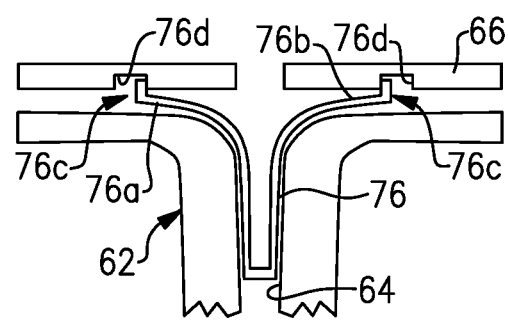
Figure 16C:
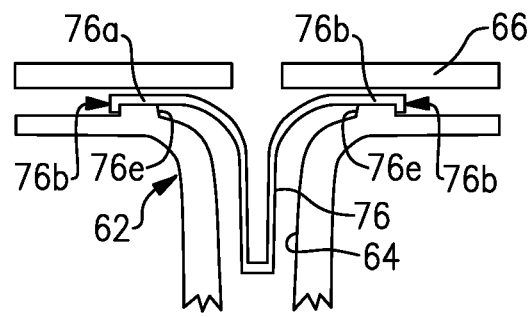

FIGS. 16A, 16B, and 16C show further examples of the baffle 76. In FIG. 16A, the baffle 76 extends in the hollow interior 64 of the airfoil 62 but protrudes out from the hollow interior 64 such that lateral arms 76a and 76b are mechanically captured between the airfoil 62 and the platform 66. In FIG. 16B, the lateral arms 76a and 76b include hooks 76c that interlock with corresponding recesses 76d in the platform 66 to mechanically secure the baffle 76. In FIG. 16C, the lateral arms 76a and 76b include hooks 76b that interlock with protrusions 76e on the outer surface of the airfoil 62.

Figure 17:
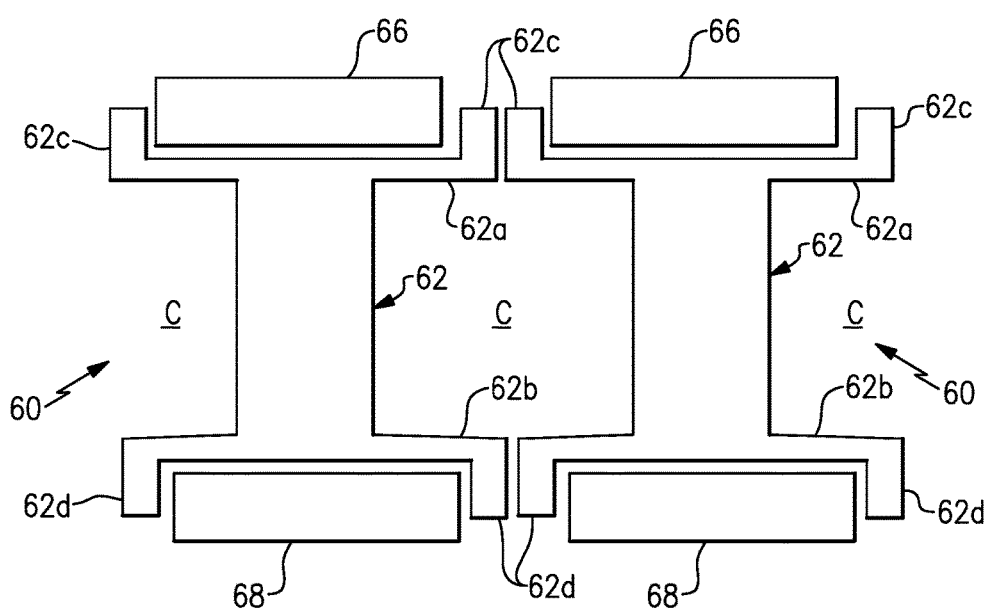
FIG. 17 illustrates two airfoil assemblies circumferentially arranged and that have protruding radial arms that partially extend around a platform.

FIG. 17 shows another example with two airfoil assemblies 60. For purposes of description, only the airfoils 62 and platforms 66/68 are shown. The airfoil assemblies 60 are circumferentially side-by-side in the depiction. The radially outer wall 62a of the airfoil 62 includes protruding radial arms 62c and the radially inner wall 62b of the airfoil includes protruding radial arms 62d. In a modified example, only radial arms 62c or only radial arms 62d could be used. The radial arms 62c/62d partially wrap or extend, respectively, around the platforms 66/68. The partial wrapping shields the platforms 66/68 from the core gas path C, thus reducing thermal distortion and exposure to high temperature excursions. Additionally, the circumferential sides of the arms 62c/62d serve as mate faces between neighboring airfoil assemblies in the engine 20.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil assembly comprising:
   at least one airfoil that has a hollow interior;
   first and second platforms between which the airfoil is disposed;
   at least one tie-spar that extends along an axis through the first platform, the hollow interior of the airfoil, and the second platform, and there is a thermal expansion difference D between a thermal expansion T1 of the tie-spar in the axial direction and a combined thermal expansion T2 of the airfoil and the first and second platforms in the axial direction; and
   a spacer portion arranged between a first end of the tie-spar and the first platform, and the spacer portion has a thermal expansion T3 in the axial direction that is greater than the thermal expansion difference D such that the spacer portion maintains the tie-spar under tension and clamps the first and second platforms on the airfoil, wherein a second end of the tie-spar abuts the second platform.

2. The airfoil assembly as recited in claim 1, wherein the spacer portion has an aspect ratio of length-to-width of greater than one, with the length being along the axial direction and the width being perpendicular to the axial direction.

3. The airfoil assembly as recited in claim 1, wherein at least one of the first and second platforms extends partially in the hollow interior of the airfoil.

4. The airfoil assembly as recited in claim 1, wherein the spacer portion includes a central through-hole, through which the tie-spar is received.

5. The airfoil assembly as recited in claim 1, wherein the spacer portion is outboard of the first platform with respect to the hollow interior of the airfoil.

6. The airfoil assembly as recited in claim 1, wherein the hollow interior of the airfoil has multiple cavities, and the at least one tie-spar includes multiple tie-spars that extend, respectively, through the multiple cavities.

7. The airfoil assembly as recited in claim 1, wherein there is an annular clearance gap between an exterior of the tie-spar and an interior of the spacer portion.

8. The airfoil assembly as recited in claim 7, wherein the exterior of the tie-spar and the interior of the spacer portion each include a thermal barrier coating.

9. The airfoil assembly as recited in claim 1, further comprising a baffle in the hollow interior of the airfoil and through which the tie-spar extends.

10. The airfoil assembly as recited in claim 9, wherein the baffle extends from the hollow interior of the airfoil to an attachment portion external of the hollow interior.

11. The airfoil assembly as recited in claim 1, further comprising a clip that abuts a bearing face of the tie-spar and a surface of the spacer portion to lock the tie-spar under tension.

12. The airfoil assembly as recited in claim 1, further comprising a classified spacer mounted on the tie-spar.

13. The airfoil assembly as recited in claim 12, wherein the classified spacer is an end cap mounted on an end of the tie-spar.

14. The airfoil assembly as recited in claim 1, wherein the airfoil includes a radial wall that has protruding radial arms that partially extend around one of the first and second platforms.

15. A gas turbine engine comprising:
an airfoil assembly that includes:
at least one airfoil that has a hollow interior;
first and second platforms between which the airfoil is disposed;
at least one tie-spar that extends along an axis through the first platform, the hollow interior of the airfoil, and the second platform, and there is a thermal expansion difference D between a thermal expansion T1 of the tie-spar in the axial direction and a combined thermal expansion T2 of the airfoil and the first and second platforms in the axial direction; and
a spacer portion arranged on the tie-spar between a first end of the tie-spar and the first platform, and the spacer portion has a thermal expansion T3 in the axial direction that is greater than the thermal expansion difference D such that the spacer portion maintains the tie-spar under tension and clamps the first and second platforms on the airfoil, wherein a second end of the tic-spar abuts the second platform.

16. A method for making an airfoil assembly, the method comprising:
arranging at least one tie-spar to extend along an axis through a first platform, a hollow interior of an airfoil, and a second platform, there being a thermal expansion difference D between a thermal expansion T1 of the tie-spar in the axial direction and a combined thermal expansion T2 of the airfoil and the first and second platforms in the axial direction; and
maintaining the tie-spar under tension to clamp the first and second platforms on the airfoil by using a spacer portion arranged on the tie-spar between a first end of the tie-spar and the first platform, and the spacer portion has a thermal expansion T3 in the axial direction that is greater than the thermal expansion difference D to maintain the tie-spar under tension and clamp the first and second platforms on the airfoil, wherein a second end of the tie-spar abuts the second platform.

17. An airfoil assembly comprising:
at least one airfoil that has a hollow interior;
first and second platforms between which the airfoil is disposed;
at least one tie-spar that extends along an axis through the first platform, the hollow interior of the airfoil, and the second platform, and there is a thermal expansion difference D between a thermal expansion T1 of the tie-spar in the axial direction and a combined thermal expansion T2 of the airfoil and the first and second platforms in the axial direction;
a threaded member configured to threadably mate with a threaded portion at a first end of the tie-spar to secure the tie-spar; and
at least one spacer portion arranged on the tie-spar, and the spacer portion has a thermal expansion T3 in the axial direction that is greater than the thermal expansion difference D such that the spacer portion maintains the tie-spar under tension and clamps the first and second platforms on the airfoil.

18. The airfoil assembly of claim 17, wherein the threaded member is a threaded end cap.

19. The airfoil assembly of claim 18, wherein the first end of the tie-spar extends through the first platform, and further comprising a classified spacer arranged between the threaded end cap and the first platform.

20. The airfoil assembly of claim 19, wherein the threaded end cap and the classified spacer comprise a single component.

21. The airfoil assembly of claim 18, wherein the threaded end cap includes a recess configured to receive the threaded portion of the tie-spar, and a land surface surrounding the recess, the land surface configured to serve as a bearing surface that receives and end of the at least one spacer portion.

22. The airfoil assembly of claim 17, wherein the threaded member is part of the first platform.

* * * * *